(12) United States Patent
Simeonov et al.

(10) Patent No.: US 9,870,422 B2
(45) Date of Patent: Jan. 16, 2018

(54) NATURAL LANGUAGE SEARCH

(71) Applicant: Dropbox, Inc., San Francisco, CA (US)

(72) Inventors: Dimitar Simeonov, San Francisco, CA (US); Joshua Blum, San Francisco, CA (US); Max Kanter, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 377 days.

(21) Appl. No.: 13/869,930

(22) Filed: Apr. 24, 2013

(65) Prior Publication Data

US 2014/0317128 A1 Oct. 23, 2014

Related U.S. Application Data

(60) Provisional application No. 61/814,008, filed on Apr. 19, 2013.

(51) Int. Cl.
*G06F 17/30* (2006.01)
*G06F 7/24* (2006.01)

(52) U.S. Cl.
CPC .......... *G06F 17/30684* (2013.01); *G06F 7/24* (2013.01)

(58) Field of Classification Search
CPC . G06F 17/30864; G06F 17/30684; G06F 7/24
USPC ................................... 707/769, 758
See application file for complete search history.

(56) References Cited

U.S. PATENT DOCUMENTS

| 5,933,822 | A | 8/1999 | Braden-Harder et al. |
| 7,213,022 | B2 | 5/2007 | Whelan et al. |
| 7,558,797 | B2* | 7/2009 | Li .......................... G06F 17/301 |
| 7,668,889 | B2 | 2/2010 | Edwards et al. |
| 7,676,496 | B2 | 3/2010 | Tamura |
| 7,886,024 | B2* | 2/2011 | Kelly ..................... G06Q 30/00 707/748 |
| 7,991,767 | B2* | 8/2011 | Brooks ............. G06F 17/30091 707/705 |
| 8,332,423 | B2* | 12/2012 | Xia ................... G06F 17/30091 707/769 |
| 8,341,223 | B1* | 12/2012 | Patton ..................... G06Q 10/10 455/416 |
| 8,380,645 | B2 | 2/2013 | Kowalski |
| 8,515,902 | B2* | 8/2013 | Savage ............. G06F 17/30014 707/608 |
| 8,863,297 | B2* | 10/2014 | Sharma ................... G06F 17/30 726/26 |
| 8,868,560 | B2* | 10/2014 | Spivack ................. G06Q 30/02 706/47 |

(Continued)

FOREIGN PATENT DOCUMENTS

| EP | 1671205 A2 | 6/2006 |
| WO | 2005/029281 A1 | 3/2005 |

*Primary Examiner* — Miranda Le
(74) *Attorney, Agent, or Firm* — Hickman Palermo Becker Bingham LLP

(57) ABSTRACT

Embodiments are provided for natural language search. In some embodiments, a content search request for content items related to an account with a content management system may be received, at least one filter from the content search query request may be determined to identify content items based on at least one of a management function and a content interaction function performed with a content item for the account, and the at least one filter may be applied to accessible content items for the account to identify content items.

21 Claims, 6 Drawing Sheets

(56) References Cited

U.S. PATENT DOCUMENTS

| | | | | |
|---|---|---|---|---|
| 8,942,729 B2* | 1/2015 | LeBlanc | H04M 3/42 | |
| | | | 455/414.2 | |
| 8,949,261 B2* | 2/2015 | Lunt | G06F 17/30864 | |
| | | | 707/722 | |
| 8,965,847 B1* | 2/2015 | Chang | G06F 17/30235 | |
| | | | 707/615 | |
| 9,043,318 B2* | 5/2015 | Kim | G06F 17/30277 | |
| | | | 707/724 | |
| 9,069,862 B1* | 6/2015 | Perkowitz | G06F 17/30867 | |
| 9,118,642 B2* | 8/2015 | Rahardja | H04L 67/36 | |
| 9,239,846 B2* | 1/2016 | Besen | G06F 17/30215 | |
| 9,239,874 B1* | 1/2016 | Madany | G06F 17/30613 | |
| 9,367,880 B2* | 6/2016 | Raina | G06Q 30/02 | |
| 2002/0152202 A1* | 10/2002 | Perro | G06F 17/30663 | |
| 2003/0126136 A1 | 7/2003 | Omoigui | | |
| 2004/0111415 A1* | 6/2004 | Scardino | G06F 17/3028 | |
| 2005/0223047 A1* | 10/2005 | Shah et al. | 707/201 | |
| 2006/0204142 A1* | 9/2006 | West | G06F 17/30864 | |
| | | | 382/305 | |
| 2007/0033191 A1* | 2/2007 | Hornkvist | G06F 17/30979 | |
| 2008/0005195 A1* | 1/2008 | Li | G06F 17/30174 | |
| 2008/0010259 A1 | 1/2008 | Feng et al. | | |
| 2008/0065699 A1* | 3/2008 | Bloebaum | G06F 17/30545 | |
| 2010/0121874 A1* | 5/2010 | Palay | G06F 17/30581 | |
| | | | 707/769 | |
| 2010/0211605 A1* | 8/2010 | Ray | 707/780 | |
| 2010/0287219 A1* | 11/2010 | Caso et al. | 707/827 | |
| 2011/0276713 A1* | 11/2011 | Brand | 709/232 | |
| 2012/0101980 A1* | 4/2012 | Taleghani | G06F 17/2288 | |
| | | | 707/608 | |
| 2012/0203733 A1* | 8/2012 | Zhang | 707/600 | |
| 2012/0233176 A1* | 9/2012 | Korn | G06F 21/6227 | |
| | | | 707/747 | |
| 2012/0233207 A1* | 9/2012 | Mohajer | 707/769 | |
| 2012/0284638 A1* | 11/2012 | Cutler | G06Q 10/00 | |
| | | | 715/751 | |
| 2012/0290592 A1* | 11/2012 | Ishii | G06F 21/6227 | |
| | | | 707/754 | |
| 2012/0324002 A1* | 12/2012 | Chen | G06F 17/30274 | |
| | | | 709/204 | |
| 2013/0013616 A1 | 1/2013 | Leidner et al. | | |
| 2013/0018960 A1* | 1/2013 | Knysz | H04L 65/403 | |
| | | | 709/204 | |
| 2013/0031643 A1* | 1/2013 | Rogel | G06F 21/10 | |
| | | | 726/29 | |
| 2013/0110905 A1* | 5/2013 | Howe et al. | 709/203 | |
| 2013/0173634 A1* | 7/2013 | Shaban Hussein | G06F 17/30165 | |
| | | | 707/748 | |
| 2013/0205251 A1* | 8/2013 | Cisler | G06F 17/30126 | |
| | | | 715/810 | |
| 2013/0226876 A1* | 8/2013 | Gati et al. | 707/652 | |
| 2013/0254897 A1* | 9/2013 | Reedy | G06F 21/10 | |
| | | | 726/26 | |
| 2013/0268480 A1* | 10/2013 | Dorman | G06F 17/30176 | |
| | | | 707/708 | |
| 2013/0275509 A1* | 10/2013 | Micucci et al. | 709/204 | |
| 2013/0282830 A1* | 10/2013 | Besen et al. | 709/205 | |
| 2013/0282857 A1* | 10/2013 | Stamper | 709/216 | |
| 2013/0290323 A1* | 10/2013 | Saib | G06F 17/30073 | |
| | | | 707/728 | |
| 2013/0290372 A1* | 10/2013 | Wallace | G06F 17/30268 | |
| | | | 707/770 | |
| 2013/0297662 A1* | 11/2013 | Sharma et al. | 707/827 | |
| 2013/0318582 A1* | 11/2013 | McCann | G06F 21/41 | |
| | | | 726/7 | |
| 2013/0318589 A1* | 11/2013 | Ford | H04L 63/08 | |
| | | | 726/7 | |
| 2013/0346405 A1* | 12/2013 | Davis | G06F 17/3012 | |
| | | | 707/736 | |
| 2014/0039893 A1* | 2/2014 | Weiner | 704/249 | |
| 2014/0188803 A1* | 7/2014 | James | G06F 17/30174 | |
| | | | 707/638 | |
| 2014/0258267 A1* | 9/2014 | Lin | G06F 17/30268 | |
| | | | 707/722 | |
| 2014/0279896 A1* | 9/2014 | Branton | G06F 17/30581 | |
| | | | 707/634 | |
| 2015/0101021 A1* | 4/2015 | McErlean | G06F 17/30575 | |
| | | | 726/4 | |

* cited by examiner sharedTable
500

| Sharer 504 | Shared Item 506 | Recipient 508 | Timestamp 510 | Active 512 | Viewed 514 |
|---|---|---|---|---|---|
| userId1 | Item100a | userId2 | May 15, 2012 | 1 | 0 |
| userId2 | Item200b | userId1 | May 30, 2012 | 0 | 1 |

516 — (row 1)
518 — (row 2)

contentItemTable
502

| UserId 520 | ContentItemId 522 | OriginalContentId 524 | CurrentSynchCopy 526 | Active 528 | DeviceId 530 | Revision 532 | ContentPointer 534 |
|---|---|---|---|---|---|---|---|
| userId1 | 100c | 100 | 0 | 1 | mobile1 | N/A | Ptr3 |
| userId1 | 100b | 100 | 1 | 1 | Computer1 | 2 | Ptr2 |
| userId1 | 100a | 100 | 0 | 0 | Tablet1 | 1 | Ptr1 |

536 — (row 1)
538 — (row 2)
540 — (row 3)

FIG. 5

NATURAL LANGUAGE SEARCH

CROSS-REFERENCE TO RELATED PROVISIONAL APPLICATION

This application claims the benefit of U.S. Provisional Patent Application No. 61/814,008 filed on Apr. 19, 2013, the disclosure of which is incorporated herein by reference in its entirety.

FIELD OF THE INVENTION

Various embodiments relate generally to natural language search.

BACKGROUND

With various known search service providers, natural language searches are used for discovery of web pages accessible on the Internet with a browser, and discovery of emails and contacts accessible on a server with an email web application. Separately, a user can search for files stored locally on their computer or other devices using search mechanisms provided by the operating system. However, these search mechanisms cannot be used by the user to search through personal files both locally on a personal computer and remotely stored on other devices and a server. Furthermore, when a user continually changes files, it is difficult to ascertain what version of a file may have been shared with another user.

Accordingly, there is a need for improved methods for content searching, in particular methods that allow searching across various devices and platforms.

SUMMARY

Embodiments are provided for natural language search. In some embodiments, a content search request for content items related to an account with a content management system may be received, at least one filter from the content search query request may be determined to identify content items based on at least one of a management function and a content interaction function performed with a content item for the account, and the at least one filter may be applied to accessible content items for the account to identify content items.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIG. 5 is an exemplary schematic representation for storage of data for natural language search in accordance with some embodiments of the invention.

DETAILED DESCRIPTION OF THE DISCLOSURE

Methods, systems, and computer readable mediums for natural language search are provided. Content management systems provide various management functionalities for content of an authenticated account. A user and/or a device can be authenticated for use of an account and allow for management of their content with the authenticated account. In particular, content management system services may include, but are not limited to the following: uploading content to remote storage to ensure the content can be accessible with one or more accounts, sharing of content from the authenticated account, sharing content with another account, organizing content for one or more accounts, managing interactions with content, and managing selective synchronization of content stored locally on one or more devices.

Metadata and/or attributes may be associated with content items in connection with the provision of management services, and content items may be identified with particular values for the metadata. Upon receipt of search requests, the content management system can identify content based on such metadata and return the set of identified content. In some embodiments, a natural language content search request approach may be supported to allow users to enter search requests without abiding by a particular format. With the natural language search approach, the search string may be evaluated to determine the nature of the query the user desires as opposed to requiring a user search request have an explicit key/value pair expressed in a predefined format (e.g., from: john doe).

For purposes of description and simplicity, methods, systems and computer readable mediums will be described for a content storage and management service, and in particular, natural language search. However, the terms "content storage service" and "content management system" are used herein to refer broadly to a variety of storage providers and management service providers as well as handling a wide variety of types of content, files, portions of files, and/or other types of data. Those with skill in the art will recognize that the methods, systems, and mediums described may be used for a variety of storage providers/services and types of content, files, portions of files, and/or other types of data.

Figure 1:
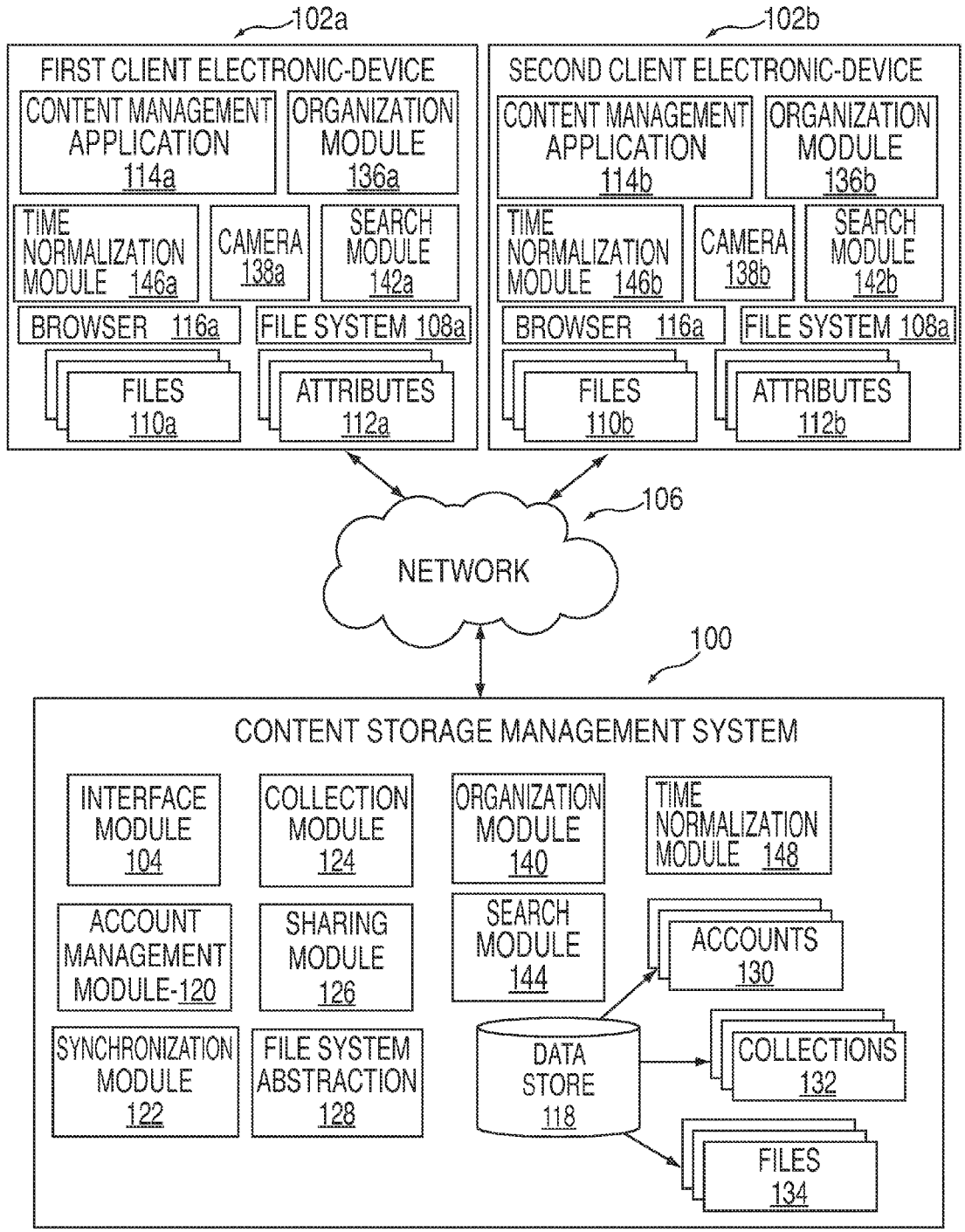
FIG. 1 is an exemplary system for natural language search in accordance with some embodiments of the invention.

FIG. 1 is an exemplary system for natural language search in accordance with some embodiments of the invention. Elements in FIG. 1, including, but not limited to, first client electronic device 102a, second client electronic device 102b, and content management system 100 may communicate by sending and/or receiving data over network 106. Network 106 may be any network, combination of networks, or network devices that can carry data communication. For example, network 106 may be any one or any combination of LAN (local area network), WAN (wide area network), telephone network, wireless network, point-to point network, star network, token ring network, hub network, or any other configuration.

Network 106 can support any number of protocols, including but not limited to TCP/IP (Transfer Control Protocol and Internet Protocol), HTTP (Hypertext Transfer Protocol), WAP (wireless application protocol), etc. For example, first client electronic device 102a and second client electronic device 102b (collectively 102) may communicate with content management system 100 using TCP/IP, and, at a higher level, use browser 116 to communicate with a web server (not shown) at content management system 100 using HTTP. Examples of implementations of browser 116, include, but are not limited to, Google Inc. Chrome™ browser, Microsoft Internet Explorer®, Apple Safari®, Mozilla Firefox, and Opera Software Opera.

A variety of client electronic devices 102 can communicate with content management system 100, including, but not limited to, desktop computers, mobile computers, mobile communication devices (e.g., mobile phones, smart phones, tablets), televisions, set-top boxes, and/or any other network enabled device. Although two client electronic devices 102a and 102b are illustrated for description purposes, those with skill in the art will recognize that any number of devices may be used and supported by content management system 100. Client electronic devices 102 may be used to create, access, modify, and manage files 110a and 110b (collectively 110) (e.g. files, file segments, images, etc.) stored locally within file system 108a and 108b (collectively 108) on client electronic device 102 and/or stored remotely with content management system 100 (e.g., within data store 118). For example, client electronic device 102a may access file 110b stored remotely with data store 118 of content management system 100 and may or may not store file 110b locally within file system 108a on client electronic device 102a. Continuing with the example, client electronic device 102a may temporarily store file 110b within a cache (not shown) locally within client electronic device 102a, make revisions to file 110b, and the revisions to file 110b may be communicated and stored in data store 118 of content management system 100. Optionally, a local copy of the file 110a may be stored on client electronic device 102a.

Client devices 102 may capture, record, and/or store content items, such as image files 110. Client devices 102 may have a camera 138 (e.g., 138a and 138b) to capture and record digital images and/or videos. For example, camera 138 may capture and record images and store metadata with the images. Metadata may include, but is not limited to, the following: creation time timestamp, geolocation, orientation, rotation, title, and/or any other attributes or data relevant to the captured image.

Metadata values may be stored as attribute 112 name-value pairs, tag-value pairs, and/or any other method to associate the metadata with the file and easily identify the type of metadata. In some embodiments, attributes 112 may be tag-value pairs defined by a particular standard, including, but not limited to, Exchangeable Image File Format (Exif), JPEG File Interchange Format (Jfif), and/or any other standard.\

A time normalization module 146 (e.g., 146a and 146b) may be used to normalize dates and times stored with a content item. An example of time normalization is provided in U.S. patent application Ser. No. 13/888,118, entitled "DATE AND TIME HANDLING," filed on May 6, 2013, which claims the benefit of U.S. Provisional Patent Application No. 61/801,318, entitled "DATE AND TIME HANDLING," filed on Mar. 15, 2013, each of which is herein incorporated by reference in its entirety. The time normalization module 146, counterpart time normalization module 148, and/or any combination thereof may be used to normalize dates and times stored for content items. The normalized times and dates may be used to sort, group, perform comparisons, perform basic math, and/or cluster content items.

An organization module 136 (e.g., 136a and 136b) may be used to organize content items (e.g., image files) into clusters, organize content items to provide samplings of content items for display within user interfaces, and/or retrieve organized content items for presentation. An example of organization is described in U.S. patent application Ser. No. 13/888,186, entitled "PRESENTATION AND ORGANIZATION OF CONTENT," filed on May 6, 2013, which claims the benefit of U.S. Provisional Patent Application No. 61/794,184, entitled "PRESENTATION AND ORGANIZATION OF CONTENT," filed on Mar. 15, 2013, each of which is herein incorporated by reference in its entirety.

The organization module 136 may utilize any clustering algorithm. The organization module 136 may be used to identify similar images for clusters in order to organize content items for presentation within user interfaces on devices 102 and content management system 100. Similarity rules may be defined to create one or more numeric representations embodying information on similarities between each of the content items in accordance with the similarity rules. The organization module 136 may use the numeric representation as a reference for similarity between content items in order to cluster the content items.

In some embodiments, content items may be organized into clusters to aid with retrieval of similar content items in response to search requests. For example, organization module 136a may identify first and second images are similar and may be group the images together in a cluster. Organization module 136a may process image files to determine clusters independently or in conjunction with counterpart organization module (e.g., 140 and/or 136b). In other embodiments, organization module 136a may only provide clusters identified with counterpart organization modules (e.g., 140 and/or 136b) for presentation. Continuing with the example, processing of image files to determine clusters may be an iterative process that is executed upon receipt of new content items and/or new similarity rules.

In some embodiments, a search module 142 on client device 102 is provided with counterpart search module 144 on content management system 144 to support search for content items. A search request may be received by search module 142 and/or 144 that requests a content item. In some embodiments, the search may be handled by searching metadata and/or attributes assigned to content items during the provision of management services. For example, cluster markers stored with images may be used to find images by date. In particular, cluster markers may indicate an approximate time or average time for the images stored with the cluster marker in some embodiments, and the marker may be used to speed the search and/or return the search results with the contents of the cluster with particular cluster markers.

Files 110 managed by content management system 100 may be stored locally within file system 108 of respective devices 102 and/or stored remotely within data store 118 of content management system 100 (e.g., files 134 in data store 118). Content management system 100 may provide synchronization of files managed by content management system 100. Attributes 112a and 112b (collectively 112) or other metadata may be stored with files 110. For example, a particular attribute may be stored with the file to track files locally stored on client devices 102 that are managed and/or synchronized by content management system 100. In some embodiments, attributes 112 may be implemented using extended attributes, resource forks, or any other implementation that allows for storing metadata with a file that is not interpreted by a file system. In particular, an attribute 112a and 112b may be a content identifier for a file. For example, the content identifier may be a unique or nearly unique identifier (e.g., number or string) that identifies the file.

By storing a content identifier with the file, a file may be tracked. For example, if a user moves the file to another location within the file system 108 hierarchy and/or modifies the file, then the file may still be identified within the local file system 108 of a client device 102. Any changes or modifications to the file identified with the content identifier may be uploaded or provided for synchronization and/or version control services provided by the content management system 100.

A stand-alone content management application 114a and 114b (collectively 114), client application, and/or third-party application may be implemented to provide a user interface for a user to interact with content management system 100. Content management application 114 may expose the functionality provided with content management interface 104. Web browser 116a and 116b (collectively 116) may be used to display a web page front end for a client application that can provide content management 100 functionality exposed/provided with content management interface 104.

Content management system 100 may allow a user with an authenticated account to store content, as well as perform management tasks, such as retrieve, modify, browse, synchronize, and/or share content with other accounts. Various embodiments of content management system 100 may have elements, including, but not limited to, content management interface module 104, account management module 120, synchronization module 122, collections module 124, sharing module 126, file system abstraction 128, data store 118, and organization module 140. The content management service interface module 104 may expose the server-side or back end functionality/capabilities of content management system 100. For example, a counter-part user interface (e.g., stand-alone application, client application, etc.) on client electronic devices 102 may be implemented using content management service interface 104 to allow a user to perform functions offered by modules of content management system 100. In particular, content management system 100 may have an organization module 140 for identifying similar content items for clusters and samples of content items for presentation within user interfaces.

The user interface offered on client electronic device 102 may be used to create an account for a user and authenticate a user to use an account using account management module 120. The account management module 120 of the content management service may provide the functionality for authenticating use of an account by a user and/or a client electronic device 102 with username/password, device identifiers, and/or any other authentication method. Account information 130 can be maintained in data store 118 for accounts. Account information may include, but is not limited to, personal information (e.g., an email address or username), account management information (e.g., account type, such as "free" or "paid"), usage information, (e.g., file edit history), maximum storage space authorized, storage space used, content storage locations, security settings, personal configuration settings, content sharing data, etc. An amount of content management may be reserved, allotted, allocated, stored, and/or may be accessed with an authenticated account. The account may be used to access files 110 within data store 118 for the account and/or files 110 made accessible to the account that are shared from another account. Account module 120 can interact with any number of other modules of content management system 100.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

Content items (e.g., files 110) can be stored in data store 118. Data store 118 can be a storage device, multiple storage devices, or a server. Alternatively, data store 118 can be cloud storage provider or network storage accessible via one or more communications networks. Content management system 100 can hide the complexity and details from client devices 102 by using a file system abstraction 128 (e.g., a file system database abstraction layer) so that client devices 102 do not need to know exactly where the content items are being stored by the content management system 100. Embodiments can store the content items in the same folder hierarchy as they appear on client device 102. Alternatively, content management system 100 can store the content items in various orders, arrangements, and/or hierarchies. Content management system 100 can store the content items in a network accessible storage (SAN) device, in a redundant array of inexpensive disks (RAID), etc. Content management system 100 can store content items using one or more partition types, such as FAT, FAT32, NTFS, EXT2, EXT3, EXT4, ReiserFS, BTRFS, and so forth.

Data store 118 can also store metadata describing content items, content item types, and the relationship of content items to various accounts, folders, collections, or groups. The metadata for a content item can be stored as part of the content item and/or can be stored separately. Metadata can be store in an object-oriented database, a relational database, a file system, or any other collection of data. In one variation, each content item stored in data store 118 can be assigned a system-wide unique identifier.

Data store 118 can decrease the amount of storage space required by identifying duplicate files or duplicate chunks of files. Instead of storing multiple copies, data store 118 can store a single copy of a file 134 and then use a pointer or other mechanism to link the duplicates to the single copy. Similarly, data store 118 can store files 134 more efficiently, as well as provide the ability to undo operations, by using a file version control that tracks changes to files, different versions of files (including diverging version trees), and a change history. The change history can include a set of changes that, when applied to the original file version, produce the changed file version.

Content management system 100 can be configured to support automatic synchronization of content from one or more client devices 102. The synchronization can be platform independent. That is, the content can be synchronized across multiple client devices 102 of varying type, capabilities, operating systems, etc. For example, client device 102a can include client software, which synchronizes, via a synchronization module 122 at content management system 100, content in client device 102 file system 108 with the content in an associated user account. In some cases, the client software can synchronize any changes to content in a designated folder and its sub-folders, such as new, deleted, modified, copied, or moved files or folders. In one example of client software that integrates with an existing content management application, a user can manipulate content directly in a local folder, while a background process monitors the local folder for changes and synchronizes those changes to content management system 100. In some embodiments, a background process can identify content that has been updated at content management system 100 and synchronize those changes to the local folder. The client software can provide notifications of synchronization operations, and can provide indications of content statuses directly within the content management application. Sometimes client device 102 may not have a network connection available. In this scenario, the client software can monitor the linked folder for file changes and queue those changes for later synchronization to content management system 100 when a network connection is available. Similarly, a user can manually stop or pause synchronization with content management system 100.

A user can also view or manipulate content via a web interface generated and served by user interface module 104. For example, the user can navigate in a web browser to a web address provided by content management system 100. Changes or updates to content in the data store 118 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 100 can include sharing module 126 for managing sharing content and/or collections of content publicly or privately. Sharing content publicly can include making the content item and/or the collection accessible from any computing device in network communication with content management system 100. Sharing content privately can include linking a content item and/or a collection in data store 118 with two or more user accounts so that each user account has access to the content item. The sharing can be performed in a platform independent manner. That is, the content can be shared across multiple client devices 102 of varying type, capabilities, operating systems, etc. The content can also be shared across varying types of user accounts. In particular, the sharing module 126 can be used with the collections module 124 to allow sharing of a virtual collection with another user or user account. A virtual collection may be a grouping of content identifiers that may be stored in various locations within file system of client device 102 and/or stored remotely at content management system 100.

The virtual collection for an account with a file storage service is a grouping of one or more identifiers for content items (e.g., identifying content items in storage). An example of virtual collections is described in provided in U.S. Provisional Patent Application No. 61/750,791, entitled "Presenting Content Items in a Collections View," filed on Jan. 9, 2013, and herein incorporated by reference in its entirety. The virtual collection is created with the collection module 124 by selecting from existing content items stored and/or managed by the file storage service and associating the existing content items within data storage (e.g., associating storage locations, content identifiers, or addresses of stored content items) with the virtual collection. By associating existing content items with the virtual collection, a content item can be designated as part of the virtual collection without having to store (e.g., copy and paste the content item file to a directory) the content item in another location within data storage in order to place the content item in the collection.

In some embodiments, content management system 100 can be configured to maintain a content directory or a database table/entity for content items where each entry or row identifies the location of each content item in data store 118. In some embodiments, a unique or a nearly unique content identifier may be stored for each content item stored in the data store 118.

Metadata can be stored for each content item. For example, metadata can include a content path that can be used to identify the content item. The content path can include the name of the content item and a folder hierarchy associated with the content item (e.g., the path for storage locally within a client device 102). In another example, the content path can include a folder or path of folders in which the content item is placed as well as the name of the content item. Content management system 100 can use the content path to present the content items in the appropriate folder hierarchy in a user interface with a traditional hierarchy view. A content pointer that identifies the location of the content item in data store 118 can also be stored with the content identifier. For example, the content pointer can include the exact storage address of the content item in memory. In some embodiments, the content pointer can point to multiple locations, each of which contains a portion of the content item.

In addition to a content path and content pointer, a content item entry/database table row in a content item database entity can also include a user account identifier that identifies the user account that has access to the content item. In some embodiments, multiple user account identifiers can be associated with a single content entry indicating that the content item has shared access by the multiple user accounts. To share a content item privately, sharing module 126 can be configured to add a user account identifier to the content entry or database table row associated with the content item, thus granting the added user account access to the content item. Sharing module 126 can also be configured to remove user account identifiers from a content entry or database table rows to restrict a user account's access to the content item. The sharing module 126 may also be used to add and remove user account identifiers to a database table for virtual collections.

To share content publicly, sharing module 126 can be configured to generate a custom network address, such as a uniform resource locator (URL), which allows any web browser to access the content in content management system 100 without any authentication. To accomplish this, sharing module 126 can be configured to include content identification data in the generated URL, which can later be used to properly identify and return the requested content item. For example, sharing module 126 can be configured to include the user account identifier and the content path in the generated URL. Upon selection of the URL, the content identification data included in the URL can be transmitted to content management system 100 which can use the received content identification data to identify the appropriate content entry and return the content item associated with the content entry.

To share a virtual collection publicly, sharing module 126 can be configured to generate a custom network address, such as a uniform resource locator (URL), which allows any web browser to access the content in content management system 100 without any authentication. To accomplish this, sharing module 126 can be configured to include collection identification data in the generated URL, which can later be used to properly identify and return the requested content item. For example, sharing module 126 can be configured to include the user account identifier and the collection identifier in the generated URL. Upon selection of the URL, the content identification data included in the URL can be transmitted to content management system 100 which can use the received content identification data to identify the appropriate content entry or database row and return the content item associated with the content entry or database row.

In addition to generating the URL, sharing module 126 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 126 can be configured to change the value of the flag to 1 or true after generating a URL to the content item.

In some embodiments, sharing module 126 can also be configured to deactivate a generated URL. For example, each content entry can also include a URL active flag indicating whether the content should be returned in response to a request from the generated URL. For example, sharing module 126 can be configured to only return a content item requested by a generated link if the URL active flag is set to 1 or true. Changing the value of the URL active flag or Boolean value can easily restrict access to a content item or a collection for which a URL has been generated. This allows a user to restrict access to the shared content item without having to move the content item or delete the generated URL. Likewise, sharing module 126 can reactivate the URL by again changing the value of the URL active flag to 1 or true. A user can thus easily restore access to the content item without the need to generate a new URL.

Figure 2:
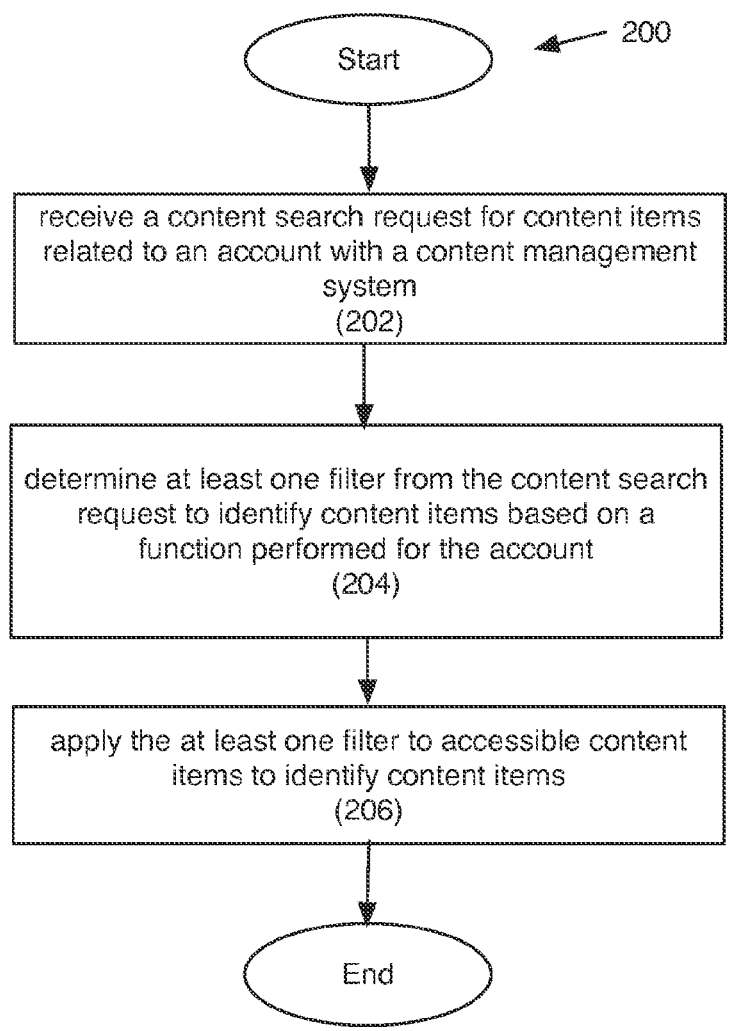
FIG. 2 is an exemplary flowchart for natural language search in accordance with some embodiments of the invention.

FIG. 2 is an exemplary flowchart 200 for natural language search in accordance with some embodiments of the invention. A content search request to identify content items from content items related to an account may be received (202). The content search request may be submitted via a user interface on client device 102a or, for example, another process executing on the client device 102a. The content search request may be created by submitting text, selecting text (e.g., suggested text available selection on the user interface, etc.), selecting content items, provided via voice commands, and/or provided by any other mechanism or combination thereof to communicate the content search request. In some embodiments, a content item, a collection of content items, a cluster of content items, and/or any other identifier for content items may be selected with the user interface to indicate a desire to search for related content items to the selected one or more content items. At least a portion of the received content search request may be in the form of a string datatype, which is a sequence of characters that may or may not include whitespace. Whitespace may be a character or a series of characters (e.g., spaces and tabs, etc.) indicating horizontal or vertical space between characters.

The content search request may be received by search module 142a or 142b, search module 144, and/or any combination thereof to handle the content search query request to identify content items from accessible content items. Content items related to the account may be stored for the account with the content management system and/or otherwise accessible to the account. Content items accessible to the account may be stored on client device 102a, stored on client device 102b, and/or stored remotely with content management system 100. The account may need to be authenticated to handle the request to return a set of identified content items from accessible content items in response to the content search request. Accessible content items to the account may be versions of content items explicitly stored for the account from one or more devices as well as content stored during the provision of management services by the content management system. In particular, with a content management system, content items may be selectively synchronized from one or more devices and shared with and/or from other accounts may provide additional versions of content items accessible to the user. By way of example, each version of content items shared with the account and/or shared from the account to other accounts or sources may be stored and accessible to the user. In another example, with selective synchronization, each version of unsynchronized content items on one or more devices supported for the account and each version of synchronized content items stored for the account may be accessible.

As such, the account may have access to many versions of a single content item provided for management with the content management system. A history or log of management or interactions performed with each content item for the account may be maintained by the content management system. A user may initially provide the content item for management with an account, and metadata may be associated with the content item indicating management functions performed for the content item. In some embodiments, metadata may be associated with the content item by storing the metadata in database tables with identifiers for the content item. Different versions of the original content item stored for the account may also be stored with the content item identifier. For example, for each content item shared, a row in a shared database table may associate metadata for the sharer and the recipient with the version of the shared content item.

Versions of the original content item managed by the content management system may include, but are not limited to, the following: storing each updated or modified version of the content item selected for synchronization, storing each copy of the content item when moved to different locations on a device, storing versions of the content item shared, storing versions of unsynchronized content items stored locally on devices that access the account, and any other version of the content item stored during the course of managing content for the account. By way of example, a version with content item identifier with "100c" of a particular content item with original content identifier "100" may be edited by a user and locally stored on device 102a that is unsynchronized (e.g., not stored as the current version of the content item at the content management system 100 and on device 102b). However, both the version of the particular unsynchronized content item with identifier "100c" on device 102a as well as the current version of a synchronized content item may be stored with content management system 100 and accessible to a user for search and retrieval. Synchronization may be selectively performed for content items. In some embodiments, synchronization settings may be assigned at varying levels of granularity for content items, including, but not limited to: settings based on an account, settings based on a device, settings based on a group of content items, and/or settings based on a single content item.

In some embodiments, a root or original content item identifier may be associated with each content item to ensure that related content items (e.g., versions, copies, etc.) for the original content item may be retrieved. For example, a content item may be selectively synchronized from each device accessing the remotely stored content item with the account, and one or more versions of the content item (e.g., versions on each device and/or remotely stored on the server) may be stored that are accessible for the authenticated account. Continuing with the example, an unsynchronized version of a content item may be stored for a first device that differs from one or more versions of content items stored at a second device and/or a remotely stored last synchronized version stored for the content item for retrieval by devices. However, each version may have the same original content item identifier stored as metadata with the version. As a result, related content items to a version of a content item may be easily retrieved and searched to identify particular versions of a content item.

At least one filter may be determined from the content search request and the at least one filter may identify content items based on a function performed for the account (204). The content search request may be a natural language search request, keyword-value pairs, and/or any other type of content search request. The content search request may be received as one or more strings that may be parsed to determine keywords and/or string literals. Any library (e.g., pyparser library), parser generator (e.g., yacc), and/or lexer generator (e.g., lex) may be used to create a lexer and/or parser to parse the content search request.

Parsing is the process of analyzing a string of symbols according to the rules of a grammar, and may be thought of as having two parts: lexical and syntactical. For example, the following regular expressions define rules of a Grammar 2.0:

[keyword [string literal]*]+

In this example, the content search request may contain at least one keyword token (e.g., as shown in Grammar 2.0 with "+" following [keyword [string literal]*] to indicate that one or more keywords may be identified) and each keyword token may optionally be followed by any number of string literals (e.g., as shown in Grammar 2.0 with "*" following [string literal] to indicate that zero or more string literals may be identified). In another example, the following regular expressions define rules of Grammar 2.1, as follows:

[keyword [string literal]$^{0+}$]$^{1+}$

In this example, the content search request may contain at least one keyword token (e.g., as shown in Grammar 2.1 with "1+" following [keyword [string literal]$^{0+}$] to indicate that one or more keywords may be identified) and each keyword token may optionally be followed by any number of string literals (e.g., as shown in Grammar 2.1 with "$^{0+}$" following [string literal] to indicate that zero or more string literals may be identified). By way of further explanation, a content search request "photos shared last week" has keyword "photos" followed by no string literals and keyword "shared" followed by string literals "last" and "week." In some embodiments, any string literals that precede a keyword may be ignored. In other embodiments, another grammar and/or mechanism may be used to interpret any words preceding an identified keyword.

During lexical analysis, whitespace may be stripped out from the content search request in accordance with the grammar or regular expressions (e.g., on word, character, and symbol boundaries) to tokenize the content search request. A token is a string of characters that is characterized according to rules as a symbol (e.g., a keyword token, a string token, a punctuation mark, etc.). For example, with the Grammar 2.0 above, the content search request may be tokenized into keyword and string literal tokens. In some embodiments, the keyword tokens and associated string literal tokens may be placed in a data structure (e.g., dictionary, parse tree, etc.) for further processing and/or tokens may be processed or interpreted on-the-fly as the tokens are identified.

During syntactical analysis, the content search request may be checked to determine whether the request contains at least one allowable expression according to the grammar. For example, a content search request may not be processed if a keyword is not found within the request. In such cases, an error message may be displayed to the user and may provide suggestions on how to enter an allowable search request. In some embodiments, another grammar and/or mechanism may be used to interpret the content search request. Each allowable expression from the content search request may be evaluated to process the content search request.

The at least one filter may be determined based upon a keyword that indicates a function performed with a content item for an account. The content management system 100 may provide various services and/or functions for content items, and provide search on metadata created and stored with the provision of the services. The content management system may perform content management functions, provide content interaction functions, and/or any other type of functionality and/or services for content items. By way of example, the content management system may provide content management services to manage content for an account, including, but not limited to, the following: sharing content, selective synchronization of content, organization of content, provision of samples of content, logging a history of interactions with content, determining affinities between content items and/or between content items and users, and/or any other services for management of content. In some embodiments, filters may be based upon a content interaction function, including, but not limited to, the following: selecting content items (e.g., a collection, a sampling of content items, etc.), tagging content items, commenting on content items, viewing content items, and/or any other interaction with a content item.

In some embodiments, a user may interact with the content to create a content search request. For example, a user may select one or more content items and refer to the selected content items to communicate the content search request (e.g., "Photos similar to selected" and "Photos organized with selected"). By way of example, a content item identifier of a selected content item may be used to query the database for content items similar to a the selected content item.

Accessible items for the account may be filtered by applying the at least one filter to identify content items (206). In some embodiments, one or more keyword tokens may be used to determine each filter applied to a set of accessible content items for the account and identify a set of content items in response to the request. Each filter for a keyword may be applied iteratively and/or multiple filters for keywords may be applied together. For example, with keywords "photos" and "shared," filters may be applied iteratively as follows: (1) a set of content items accessible to the user may be reduced to a set of images accessible to the user, and (2) the set of images may be reduced to a set of images that have been shared. In this example, a query may be executed against the database to (1) select all images accessible for the account, and (2) select all shared content items for the account from the selected images. Alternatively, with the same example keywords, multiple filters may be applied together and a query may be executed against the database to select all shared and image content items for the account. Those with skill in the art will recognize the benefit of iteratively applying filters, applying multiple filters together, and/or applying multiple filters using any combination thereof.

Figure 3:
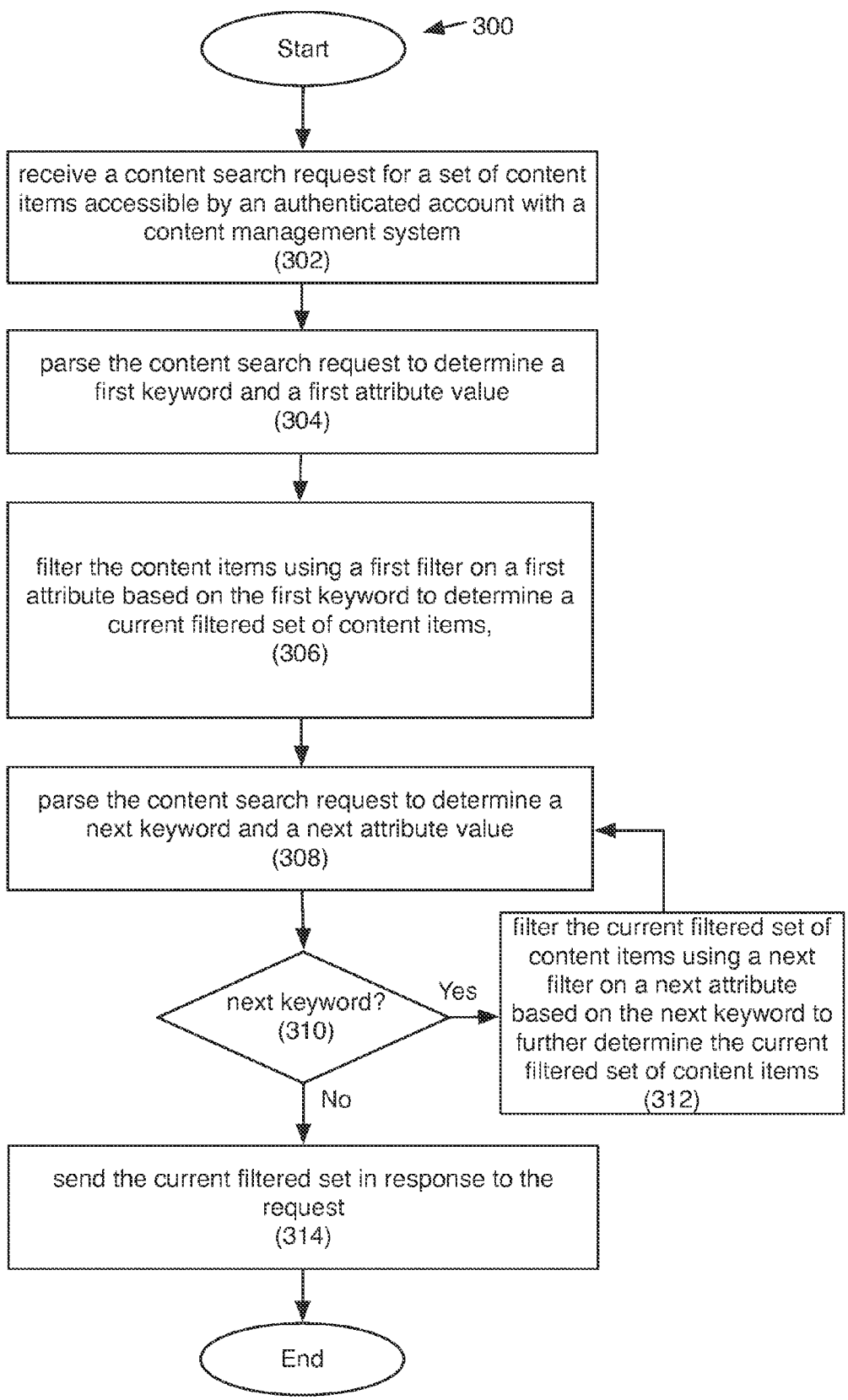
FIG. 3 is an exemplary flowchart for natural language search in accordance with some embodiments of the invention.

FIG. 3 depicts exemplary flowchart 300 for natural language search in accordance with some embodiments of the invention. The flowchart 300 presents an iterative approach to applying filters identified in a content search request received by a content management system, as described above. A content search request for a set of content items drawn from accessible content items of an account may be received (302). The content search request may be processed by a device using the authenticated account. An account identifier (e.g., 'userId1,' as shown in contentItemTable 502, described in more detail in connection with FIG. 5) may be used to determine content items that are accessible with the authenticated account. To determine the set of content items from accessible content items for the account, the content search request may be processed.

The content search request may be parsed to determine a first keyword and a first attribute value (304). Keywords and the associated filter to apply may be predefined for the content management system and/or the user may define keywords and filters to apply upon receipt of the keyword in the request. String literals may be used as attribute values when applying the filters identified with the keywords. For example, the attribute values may be stored as values for attributes of content items in database tables.

The grammar (e.g., Grammar 2.0) may be provided to enable users and/or third party developers to define keywords and corresponding filters or modifications to existing filters to apply in response to requests with the keywords. Example pseudocode for establishing keyword tokens may be, for example, as follows:

```
tokens = { "$photo" : [ "photo" , "images" , "fotos"],
"$date" : ["created", "modified"],
"$location" : ["near", "cerca" , "vers," "pres," "at" ] ,
"$past" : [ "last" ],
"$name" : ["titled" , "from" , "by" , "named"],
"$music" : ["songs", "music"],
"$shared" : ["shared" , "provided" ],
"$synchronized" : [ "current" , "stored" , "synchronized"],
"$version" : ["version"],
"$notSynchronized" : ["not synchronized" , "on device"],
$related : ["similar to"]};
```

As shown, keywords may be provided in one or more languages (e.g., "near," "vers," "pres," and "cerca"). The keyword tokens may be mapped to particular filters that may be applied. Those with skill in the art will recognize that the provided keyword tokens are not an exhaustive list of tokens and are provided merely as examples.

Accessible content items may be filtered using a first filter on a first attribute based on the first keyword (306). The keyword may indicate the filter that may be used and optionally a string literal may be used as an attribute value with the filter to identify the current filtered set of content items in response to the request. With the example keyword tokens and example Grammar 2.0, the following example content search requests with a filter based on a keyword and an attribute value may be handled:

| No. | Content search request |
|---|---|
| (1) | "songs by the Name1" to select all music files by 'the Name1' accessible with the account, |
| (2) | "songs by the Name1 shared by Name2" to select music files by 'the Name1' that are shared with the account by 'Name2' from all the music files accessible by the account |
| (3) | "songs by 'the Name1' on device 'DeviceName'" to select music files by 'the Name1' that are stored on device with 'DeviceName' from all music files accessible by the account |

In an iterative approach, a first filter on music files may be applied with attribute value 'the Name1' to determine a current filtered set of content items for examples (1), (2), and (3).

Following this processing, the content search request may be parsed to determine a next keyword and a next attribute value (308). If there are no more keywords in the content request (310) (e.g., example (1)), then the current filtered set is sent in response to the request (314).

Alternatively, if there is next keyword (310) in the request, then the current filtered set is further filtered using a next filter on a next attribute based on the next keyword (312). As shown with examples (2) and (3), a first filter on music files may be applied with attribute value 'the Name1' to determine a current filtered set of content items and a next filter may be applied to further filter the current filtered set. Filters based on various management and/or content interaction functions performed by or with the content management system may be applied. For example, filters may be applied based upon various conditions and/or affinities, including, but not limited to, the following: time based, location based, event based, relationships between content items and/or between content items and users, event based, and/or any other connections or commonalities. Examples of conditions and affinities are provided in U.S. Provisional Patent Application No. 61/800,0039, entitled "Shuffle Algorithm and Navigation," filed on Mar. 15, 2013, and herein incorporated by reference in its entirety.

With example (2), a next filter is to be applied on the current filtered set based on a next keyword 'shared' so as to filter content items based on a sharing function. Continuing with example (2), the current filtered set may be further filtered based upon whether the music files were shared by 'Name2.' With example (3), a next filter is to be applied on the current filtered set based on a next keyword 'on device' indicating management function of selective synchronization, and the current filtered set may be further filtered to include versions of synchronized and unsynchronized versions of content items on device with identifier 'DeviceName.' In some embodiments, by indicating a device that stores files in example (3), a user may be indicating that both synchronized and unsynchronized files stored on the device may be retrieved, if stored on the device using the account. In some embodiments, a user may indicate to search for only synchronized and/or unsynchronized content items.

The content search request may be repeatedly parsed (308) and filtered (312), if there are additional keywords (310). Alternatively, if there are no more keywords (310), then the current filtered set is sent in response to the request (314).

A keyword may indicate multiple filters may need to be applied and further processing may be performed with string literals to determine attribute values to apply with the filter. The following examples are relevant to the discussion:

| No. | Content search request |
|---|---|
| (4) | "fotos cerca Monterey" |
| (5) | "photos shared on May 15, 2012" |
| (6) | "photos not synchronized similar to selected" [refers to selected contentItemId] |
| (7) | "versions of photos shared last Monday" |

With example (4) "fotos cerca Monterey" content request, the content request may be processed to select image files with a geolocation near to latitude and longitudes for Monterey, and the longitude and latitude for Monterey may need to be determined (e.g., retrieved from a database based upon the city name) as an attribute value range to apply the filter. With example (5) the "photos shared on May 15, 2012" content request, the content request is processed to select image files both shared with the account or from the account on May 15, 2012, and both filters may be applied with the account identifier as an attribute value for a first filter as sharer and a second filter as recipient. With example (6) "photos not synchronized similar to selected [contentItemId]" content request, the content request may be processed to select image files stored locally on devices and not synchronized that are related to, organized with, and/or in the same collection with a selected 'contentItemId.' A user may select a particular content item and/or collection of content items via the user interface to indicate a search with one or more content item identifiers. With example (6), content items that are related may have the same original content item root and may be modified or updated versions of the original content item for 'contentItemId' and may be returned in response to a database query using the content item identifier. Content items that are organized with and/or in the same collection with content items with the 'contentItemId' may also be similar to the content item with 'contentItemId' and returned in response to the request. With example (7), versions of content items that were shared on the last Monday from the present date may be retrieved.

Figure 4:
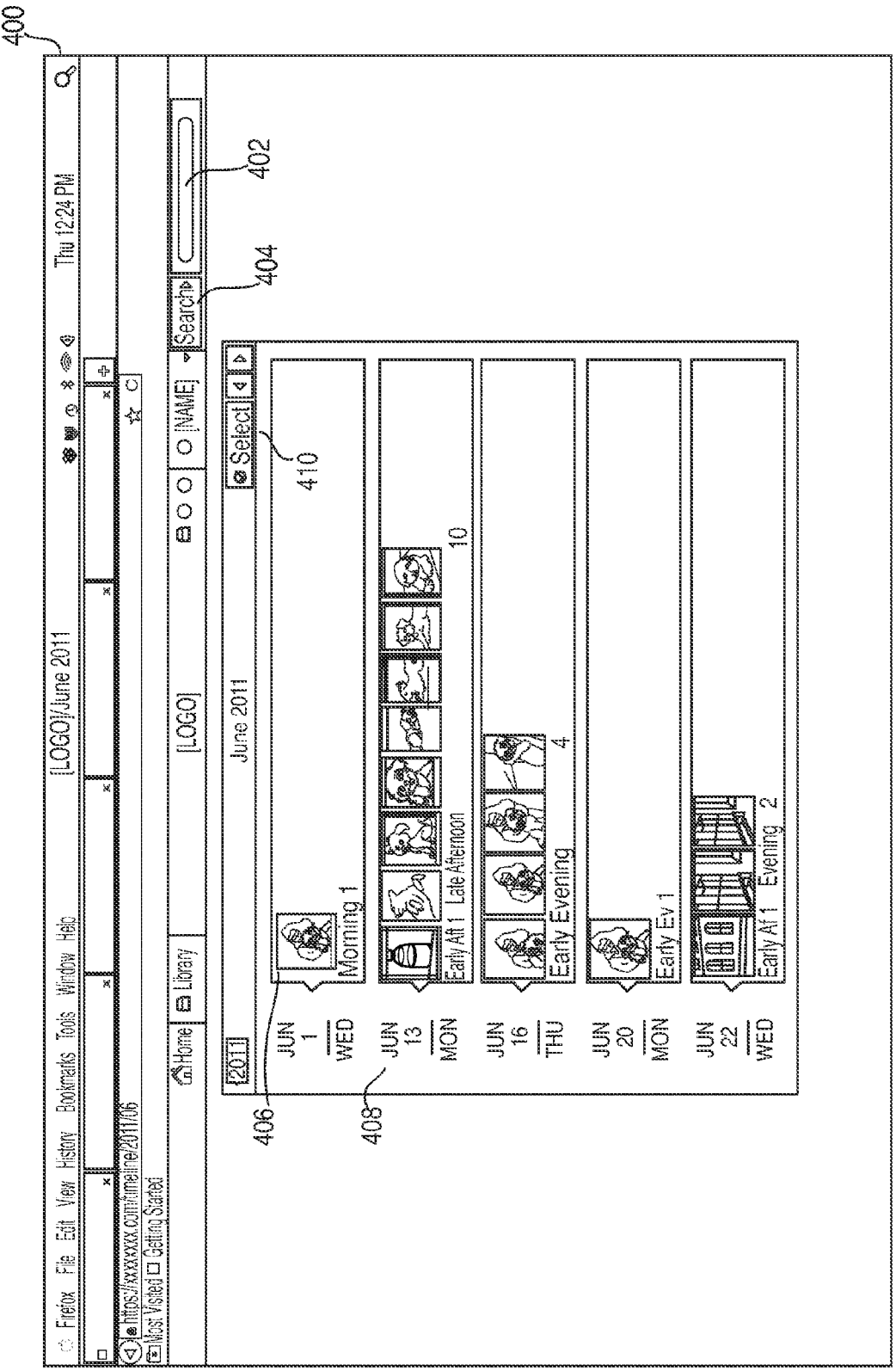
FIG. 4 illustrates an exemplary user interface for natural language search in accordance with some embodiments of the invention.

FIG. 4 illustrates an exemplary user interface 400 for natural language search in accordance with some embodiments of the invention. As illustrated, the user interface 400 has a search text entry 402 and user control 404 to submit a content search request. A select user control 410 may be used to select content items. The user may hover over and/or click on user control 410 with the cursor to indicate selection mode. In selection mode, a user may select a content item 406 and/or a collection of content items 408 to reference in the content search request. As described above, with example (6), a user can request "photos not synchronized similar to selected" and the use of content item identifier for the selected content item 406 may be used in the database query formed from the content search request. In some embodiments, a selected content item 406, a selected cluster 408 (e.g., "Late Afternoon" cluster), and/or selected collection of content items (e.g., 408 and 406) may be used to indicate content items that may be "similar to" requested content items. Related content items (e.g., versions of content items) and/or content items organized with content items having identifiers of the selected content item(s) may be retrieved.

FIG. 5 is an exemplary schematic representation for storage of data for natural language search in accordance with some embodiments of the invention. FIG. 5 provides exemplary database entities sharedTable 500 and contentItemTable 502 for some embodiments of the invention. One or more database entities can be used to store content items, content item share data, attribute information, and/or metadata within data store 118. In a relational database, an entity may be a database table or view. In an object database, the entity may map to an object class. The database table may be represented with columns that are fields for the database table and rows that represent the records of the database table. Each row or record in the database table may have one or more values for the database fields of the database table. Although examples provided throughout may refer to an entity as a database table, those skilled in the art will recognize that there are various ways an entity of a database design may be implemented.

SharedTable 500 is a database table for content shares stored within data store 118. Shared Table 500 has database fields depicted as follows: content sharer 504, shared item 506, recipient 508, active flag 512, viewed flag 514, and timestamp 510. Sharing module 126 may be used to associate a content sharer, one or more shared items, and a recipient to create a content share. For example, a new row may be created when a new content share is created and populated with values for content sharer 504, shared item 506, and recipient 508 fields.

A user with an authenticated account may request to view a particular shared item, and in response, a query is executed against the database to select content shares (e.g., a row in sharedTable 500) where shared item 506 field has the value for the particular shared item identifier and the recipient 508 field has the value for the user account identifier. The shared item identifier may be an identifier for an album, a virtual collection, a particular content item, a lightweight share, and/or any other identifier for one or more content items. An album may be a group of content items stored within a folder or directory on file system of client device 102 and/or stored remotely at content management system 100.

A lightweight share, akin to a virtual collection, may be a grouping of content identifiers that may be stored in various locations within file system of client device 102 and/or stored remotely at content management system 100. With the lightweight share identifier, all of the content items associated with the lightweight share identifier (e.g., stored with lightweight share identifier in data store) may be retrieved.

A sharing filter may be applied by retrieving content shares for an authenticated account either as sharer 504 and/or recipient 508 from data storage. For example, content shares may be retrieved from the database by executing a query against the database to retrieve all content shares where sharer field 504 has a value with the user account identifier and/or associated with the user account identifier (e.g., an account with a third party application). The results from executing the query to select all rows from sharedTable 500 where sharer field 504 has a value of or associated with the user account identifier may be used to retrieve shared items. A sharer field 504 and a recipient field 508 may have values for a user account identifier, an account identifier associated with a third party application, and/or any other identifier for an account permitting shares.

By way of example, to apply a filter to retrieve shared content for account identifier of "userId1," a query may be executed against the database for the account identifier of "userId1," and two content shares at rows 516 and 518 may be retrieved for "userId1." As shown in row 516 of sharedTable 500, sharer 504 with a user account identifier "userId1" has an active content share as denoted with a "1"/True value in active 512 field. The active content share of row 516 has a shared item with identifier "Item100*a*" for recipient 508 with an account identifier for "userId2." The viewed content item as denoted by viewed 514 flag set to "1"/True in row 516. The timestamp 510 may optionally be set to indicate a creation date, an activation date and/or activation date range for the content share.

Continuing with the retrieval of shared content example for account identifier of "userId1," as shown with row 518 of shareTable 500, recipient 508 with user account identifier for "userId1" has a shared item 506 of "Item200*b*" that is currently not active 512 as indicated by "0"/False value for active flag 512 in row 518.

ContentItemTable 502 is a database table for content items stored within data store 118. ContentItemTable 502 has database fields depicted as follows: userId 520, contentItemId 522, originalContenItemId 524, currentSynchCopy 526, active flag 528, deviceId 530, revision 532, and content pointer 534. ContentItemTable 502 may remotely store content items that are both synchronized and unsynchronized content items stored locally on a device. As shown in row 536, contentItemId "100*c*" is not the current synchronized copy as denoted with "0/False" with field currentSynchcopy 526. Instead, contentItemId "100*c*" is a locally stored version on device with identifier "mobile1" as denoted in DeviceId 530 field. Alternatively, as shown in row 538, version with contentItemId 522 identifier "100*b*" is the current synchronized copy as denoted by "1/True" in the currentSynchCopy 526 field. In row 540, an inactive content item version with contentItemId 522 is provided.

ContentItemTable 502 may also provide information on related content items. For example, as shown in rows 536, 538, and 540, content items with contentItemId 522 100*a-c* are related because each has originalContentId "100."

An index may be created for a database column or field of a database table to optimize the retrieval of data. In a preferred embodiment, use of the index may allow for retrieval of data without a full scan of a database table and/or a full scan of data accessible. Indexes may be created for the entire database column (e.g. for all data rows) and/or for a portion of the database column (e.g. a subset of data rows). For example, the index may be created for a subset of values for a column of a database table that are for a particular user account.

A database cursor may be used to keep track of the current state for content items locally stored on a client device within the file system of the client device and/or cache of the client device. For example, the database cursor may point to a row in a database for a revision of a content share that is currently stored within a cache on a client device. With knowledge of the cached version, updates to the content shares can be sent to the client device.

Those with skill in the art will recognize that sharedTable 500 and contentItemTable 502 are meant to illustrate an exemplary storage mechanism where content shares and other metadata associated with content share may be stored and modified by the user with an authenticated account.

Figure 6:
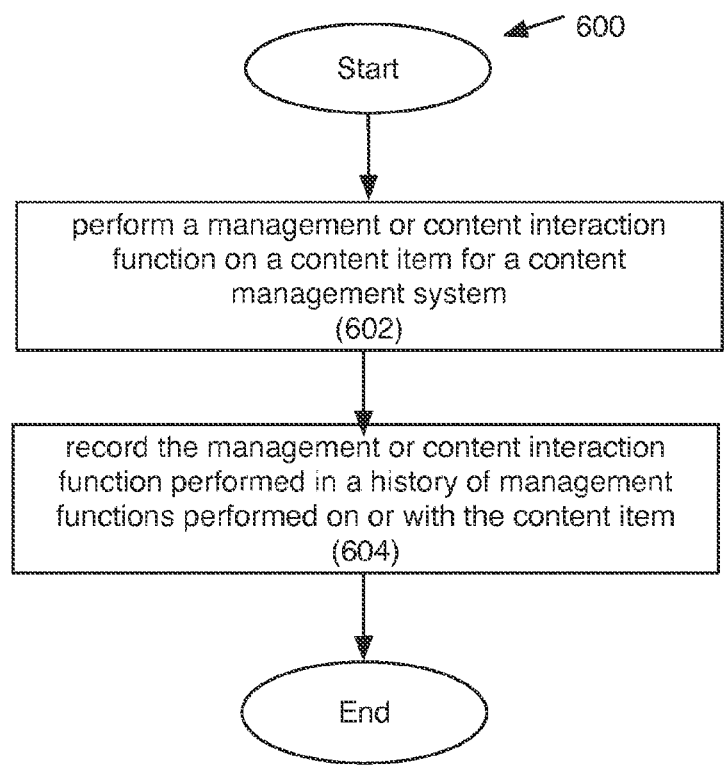
FIG. 6 is an exemplary flowchart for natural language search in accordance with some embodiments of the invention.

FIG. 6 is an exemplary flowchart for natural language search in accordance with some embodiments of the invention. Flowchart 600 illustrates creation of a history of management functions performed and storage of related metadata. In the course of performing management functions, metadata may be associated with content items that may be used as attributes and/or criteria for search requests. A management function may be performed for a content item (602). For example, a content item may be shared from one account with another account. In another example, a content interaction function may have been requested by the user. The function performed may be recorded to form a history of functions performed for the content item (604). The requested functions may be logged as well as metadata related to performing the function thereby forming a history of the functions performed. As shown in FIG. 5, sharedTable 500 and contentItemTable 502 provide examples of database entities that may be used to store a history of functions performed and related metadata. By way of example, sharedTable 500 provides a history of shares and contentItemTable 502 provides a history of versions of content items.

Exemplary Implementations

Any suitable programming language can be used to implement the routines of particular embodiments including, but not limited to, the following: C, C++, Java, JavaScript, Python, Ruby, CoffeeScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time Particular embodiments may be implemented in a computer-readable storage device or non-transitory computer readable medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for natural language search thereof, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed is:

1. A method for natural language search, comprising:
at a content management system comprising one or more processors and one or more programs executed by the one or more processors to perform the method, performing operations comprising:
receiving a content item search request for searching content items associated with a particular user account held with the content management system;
parsing the content item search request according to rules of a grammar to identify a plurality of keywords of the content item search request;
identifying a first keyword, of the plurality of keywords, which specifies a type of content item that is a subject of the content item search request;
identifying a second additional keyword, of the plurality of keywords, which specifies a particular content item management function, of a plurality of predefined content item management functions, that is a subject of the content item search request;
based, at least in part, on the identifying the second additional keyword, selecting, from among the plurality of predefined content item management functions, the particular content item management function as a subject of the content item search request;
wherein the particular content item management function is selected from the group consisting of:
sharing a content item with a target user account held with the content management system,
organizing a content item into a target cluster of similar content items,
determining a similarity between a content item and a target content item, and
synchronizing a content item to a target computing device;
identifying one or more additional keywords, of the plurality of keywords, which specifies a target of the particular content item management function;
wherein the identifying the first keyword, the identifying the second additional keyword, and the identifying the one or more additional keywords are based, at least in part, on the parsing the content item search request according to the rules of the grammar;
verifying one or more content items, of the content items associated with the particular user account, each satisfy both of the following conditions:
(a) the each content item is of the type of content item that is the subject of the content item search request specified by the first keyword, and
(b) the particular content item management function specified by the second additional keyword has been performed on the each content item for the target specified by the one or more additional keywords;
and
based, at least in part, on the verifying that each of the one or more content items satisfy both conditions (a) and (b), providing, in a response to the content item search request, a search result that identifies the one or more content items, of the content items associated with the particular user account, that each satisfy both conditions (a) and (b).

2. The method of claim 1, wherein the content items comprise content items stored at least one of locally or remotely.

3. The method of claim 1, wherein at least a portion of the content item search request comprises a string datatype.

4. The method of claim 1 wherein the content item search request comprises at least one of submitting text, selecting text, or providing voice commands.

5. The method of claim 1, wherein the content items are selectively synchronized with the particular user account.

6. The method of claim 1, wherein identifying the second additional keyword comprises applying one or more regular expressions to the content item search request.

7. The method of claim 1, wherein determining which, if any, of the content items associated with the particular user account satisfy both of the conditions (a) and (b) comprises performing an iterative filtering operation comprising:
identifying a first set of one or more content items, of the content items associated with the particular user account, that satisfy condition (a); and
identifying, among the first set of one or more content items, a second set of one or more content items that satisfy condition (b).

8. One or more non-transitory computer-readable media storing instructions which, when executed by one or more processors, cause the one or more processors to perform operations comprising:
receiving a content item search request for searching content items associated with a particular user account held with a content management system;
parsing the content item search request according to rules of a grammar to identify a plurality of keywords of the content item search request;
identifying a first keyword, of the plurality of keywords, which specifies a type of content item that is a subject of the content item search request;
identifying a second additional keyword, of the plurality of keywords, which specifies a particular content item management function, of a plurality of predefined content item management functions, that is a subject of the content item search request;
based, at least in part, on the identifying the second additional keyword, selecting, from among the plurality of predefined content item management functions, the particular content item management function as a subject of the content item search request;
wherein the particular content item management function is selected from the group consisting of:
sharing a content item with a target user account held with the content management system,
organizing a content item into a target cluster of similar content items,
determining a similarity between a content item and a target content item, and
synchronizing a content item to a target computing device;
identifying one or more additional keywords, of the plurality of keywords, which specifies a target of the particular content item management function;
wherein the identifying the first keyword, the identifying the second additional keyword, and the identifying the one or more additional keywords are based, at least in part, on the parsing the content item search request according to the rules of the grammar;
verifying one or more content items, of the content items associated with the particular user account, each satisfy both of the following conditions:

(a) the each content item is of the type of content item that is the subject of the content item search request specified by the first keyword, and (b) the particular content item management function specified by the second additional keyword has been performed on the each content item for the target specified by the one or more additional keywords; and based, at least in part, on the verifying that each of the one or more content items satisfy both conditions (a) and (b), providing, in a response to the content item search request, a search result that identifies the one or more content items, of the content items associated with the particular user account, that each satisfy both conditions (a) and (b).

9. The one or more non-transitory computer-readable media of claim 8, wherein the content items comprise content items stored at least one of locally or remotely.

10. The one or more non-transitory computer-readable media of claim 8, wherein at least a portion of the content item search request comprises a string datatype.

11. The one or more non-transitory computer-readable media of claim 8, wherein the content item search request comprises at least one of submitting text, selecting text, or providing voice commands.

12. The one or more non-transitory computer-readable media of claim 8, wherein the operations further comprise the operation of selectively synchronizing the content items with the particular user account.

13. The one or more non-transitory computer-readable media of claim 8, wherein identifying the second additional keyword comprises applying regular expressions to the content item search request.

14. The one or more non-transitory computer-readable media of claim 8, wherein determining which, if any, of the content items associated with the particular user account satisfy both of the conditions (a) and (b) comprises performing an iterative filtering operation comprising:

identifying a first set of one or more content items, of the content items associated with the particular user account, that satisfy condition (a); and identifying, among the first set of one or more content items, a second set of one or more content items that satisfy condition (b).

15. A system comprising:
one or more processors;
one or more non-transitory computer-readable media storing one or more computer programs for execution by the one or more processors, the one or more computer programs comprising instructions configured for:
receiving a content item search request for searching content items associated with a particular user account held with a content management system;
parsing the content item search request according to rules of a grammar to identify a plurality of keywords of the content item search request;
identifying a first keyword, of the plurality of keywords, which specifies a type of content item that is a subject of the content item search request;
identifying a second additional keyword, of the plurality of keywords, which specifies a particular content item management function, of a plurality of predefined content item management functions, that is a subject of the content item search request;
based, at least in part, on the identifying the second additional keyword, selecting, from among the plurality of predefined content item management functions, the particular content item management function as a subject of the content item search request;
wherein the particular content item management function is selected from the group consisting of:
sharing a content item with a target user account held with the content management system,
organizing a content item into a target cluster of similar content items,
determining a similarity between a content item and a target content item, and
synchronizing a content item to a target computing device;
identifying one or more additional keywords, of the plurality of keywords, which specifies a target of the particular content item management function;
wherein the identifying the first keyword, the identifying the second additional keyword, and the identifying the one or more additional keywords are based, at least in part, on the parsing the content item search request according to the rules of the grammar;
verifying one or more content items, of the content items associated with the particular user account, each satisfy both of the following conditions:
(a) the each content item is of the type of content item that is the subject of the content item search request specified by the first keyword, and
(b) the particular content item management function specified by the second additional keyword has been performed on the each content item for the target specified by the one or more additional keywords; and based, at least in part, on the verifying that each of the one or more content items satisfy both conditions (a) and (b), providing, in a response to the content item search request, a search result that identifies the one or more content items, of the content items associated with the particular user account, that each satisfy both conditions (a) and (b).

16. The system of claim 15, wherein the content items comprise content items stored at least one of locally or remotely.

17. The system of claim 15, wherein at least a portion of the content item search request comprises a string datatype.

18. The system of claim 15, wherein the content item search request comprises at least one of submitting text, selecting text, or providing voice commands.

19. The system of claim 15, wherein the instructions are further configured for selectively synchronizing the content items with the particular user account.

20. The system of claim 15, wherein identifying the second additional keyword comprises applying regular expressions to the content item search request.

21. The system of claim 15, wherein determining which, if any, of the content items associated with the particular user account satisfy both of the conditions (a) and (b) comprises performing an iterative filtering operation comprising:
identifying a first set of one or more content items, of the content items associated with the particular user account, that satisfy condition (a); and
identifying, among the first set of one or more content items, a second set of one or more content items that satisfy condition (b).

* * * * *